US011449832B2

(12) United States Patent
Shapiro

(10) Patent No.: US 11,449,832 B2
(45) Date of Patent: Sep. 20, 2022

(54) SYSTEMS AND METHODS FOR OBTAINING DATA ANNOTATIONS

(71) Applicant: Allstate Insurance Company, Northbrook, IL (US)

(72) Inventor: Glenn Shapiro, Northbrook, IL (US)

(73) Assignee: ALLSTATE INSURANCE COMPANY, Northbrook, IL (US)

(*) Notice: Subject to any disclaimer, the term of this patent is extended or adjusted under 35 U.S.C. 154(b) by 12 days.

(21) Appl. No.: 16/874,181

(22) Filed: May 14, 2020

(65) Prior Publication Data
US 2020/0364665 A1    Nov. 19, 2020

Related U.S. Application Data

(60) Provisional application No. 62/854,417, filed on May 30, 2019, provisional application No. 62/849,634, filed on May 17, 2019.

(51) Int. Cl.
*G06Q 10/06* (2012.01)
*G06Q 10/10* (2012.01)
*G06F 16/55* (2019.01)
*G06Q 30/00* (2012.01)
*G06Q 30/02* (2012.01)
*G06Q 40/08* (2012.01)
*G06Q 20/08* (2012.01)

(52) U.S. Cl.
CPC ............. *G06Q 10/10* (2013.01); *G06F 16/55* (2019.01); *G06Q 10/06311* (2013.01); *G06Q 20/085* (2013.01); *G06Q 30/0185* (2013.01); *G06Q 30/0278* (2013.01); *G06Q 30/0282* (2013.01); *G06Q 40/08* (2013.01)

(58) Field of Classification Search
None
See application file for complete search history.

(56) References Cited

U.S. PATENT DOCUMENTS 10,573,012 B1 *  2/2020  Collins ..................... G06T 7/60
10,685,400 B1 *  6/2020  Brandmaier ........... G06Q 40/08
(Continued)

FOREIGN PATENT DOCUMENTS

WO    2017091308 A1    6/2017

OTHER PUBLICATIONS

Aug. 6, 2020—(WO) International Search Report & Written Opinion—PCT/US20/033107.

*Primary Examiner* — Bruce I Ebersman
*Assistant Examiner* — Matthew Cobb
(74) *Attorney, Agent, or Firm* — Foley & Lardner LLP

(57) ABSTRACT

Systems and methods are provided for obtaining data annotations from a crowdsourced group of individuals. The individuals can be provided with a set of data describing damage to an item and a variety of annotations can be applied to the data. In a variety of embodiments, multiple individuals can review the same claim and a final claim outcome can be determined based on the multiple reviews. In many embodiments, machine classifiers can process the set of data to identify particular features within the data. Scoring data can be generated, based on annotations provided by other individuals and/or machine classifiers that reflects the adjuster's skill at identifying features within the data and annotating the data. Claims can be assigned to individuals based on the score assigned to the individual.

16 Claims, 7 Drawing Sheets

(56) References Cited

U.S. PATENT DOCUMENTS

| | | | |
|---|---|---|---|
| 10,692,050 B2* | 6/2020 | Taliwal | G06V 10/82 |
| 11,144,889 B2* | 10/2021 | Li | G06N 20/20 |
| 2010/0318383 A1 | 12/2010 | Hargroder | |
| 2012/0076437 A1 | 3/2012 | King | |
| 2013/0304674 A1 | 11/2013 | Isaacs | |
| 2014/0316825 A1 | 10/2014 | van Dijk et al. | |
| 2015/0046101 A1* | 2/2015 | Akita | G01F 1/66 |
| | | | 702/50 |
| 2015/0221041 A1 | 8/2015 | Hanson et al. | |
| 2015/0248730 A1* | 9/2015 | Pilot | G06Q 10/06 |
| | | | 705/4 |
| 2017/0352103 A1* | 12/2017 | Choi | H04W 4/021 |
| 2020/0118056 A1* | 4/2020 | Leslie | G06Q 10/063112 |
| 2020/0410001 A1* | 12/2020 | Sarkissian | H04L 67/306 |
| 2022/0051338 A1* | 2/2022 | Brandmaier | G06F 16/51 |

* cited by examiner

SYSTEMS AND METHODS FOR OBTAINING DATA ANNOTATIONS

CROSS-REFERENCE TO RELATED APPLICATIONS

This application claims priority to U.S. Provisional Patent Application No. 62/849,634, entitled "Systems and Methods for Obtaining Data Annotations" and filed May 17, 2019, and to U.S. Provisional Patent Application No. 62/854,417, entitled "Systems and Methods for Obtaining Data Annotations" and filed May 30, 2019, the disclosures of which are hereby incorporated by reference in their entirety.

TECHNICAL FIELD

Aspects of the disclosure relate to data processing systems and more specifically to analyzing damage to an item.

BACKGROUND

Conventional insurance claims processing is a complex process that starts with a first notification of loss related to an insured item. Upon notification of loss, the claim can be routed to multiple claims adjusters that analyze different aspects of the damage associated with the insured item in order to determine whether compensation for the loss is appropriate.

SUMMARY OF THE INVENTION

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Conventional claims adjustment can involve paperwork processing, telephone calls, and potentially face-to-face meetings between claimant and adjuster. In addition, a significant amount of time can elapse between a first notice of loss from the claimant and the final settlement of the claim. Systems and methods in accordance with embodiments of the disclosure can automatically determine an adjuster device to be assigned to process a particular claim. The adjuster device can be provided with a set of data describing damage to an item and a variety of annotations can be applied to the data. In a variety of embodiments, multiple adjuster devices can review the same claim and a final claim outcome can be determined based on the multiple reviews. In many embodiments, machine classifiers may process the set of data to identify particular features within the data. Scoring data can be generated, based on annotations provided by other adjuster devices and/or machine classifiers, reflecting the adjuster device's skill at identifying features within the data and annotating the data. Claims can be assigned to adjuster devices based on the score assigned to the adjuster device.

The arrangements described can also include other additional elements, steps, computer-executable instructions, or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF THE DRAWINGS

The present invention is illustrated by way of example and is not limited by the accompanying figures in which like reference numerals indicate similar elements and in which.

DETAILED DESCRIPTION

Figure 1:
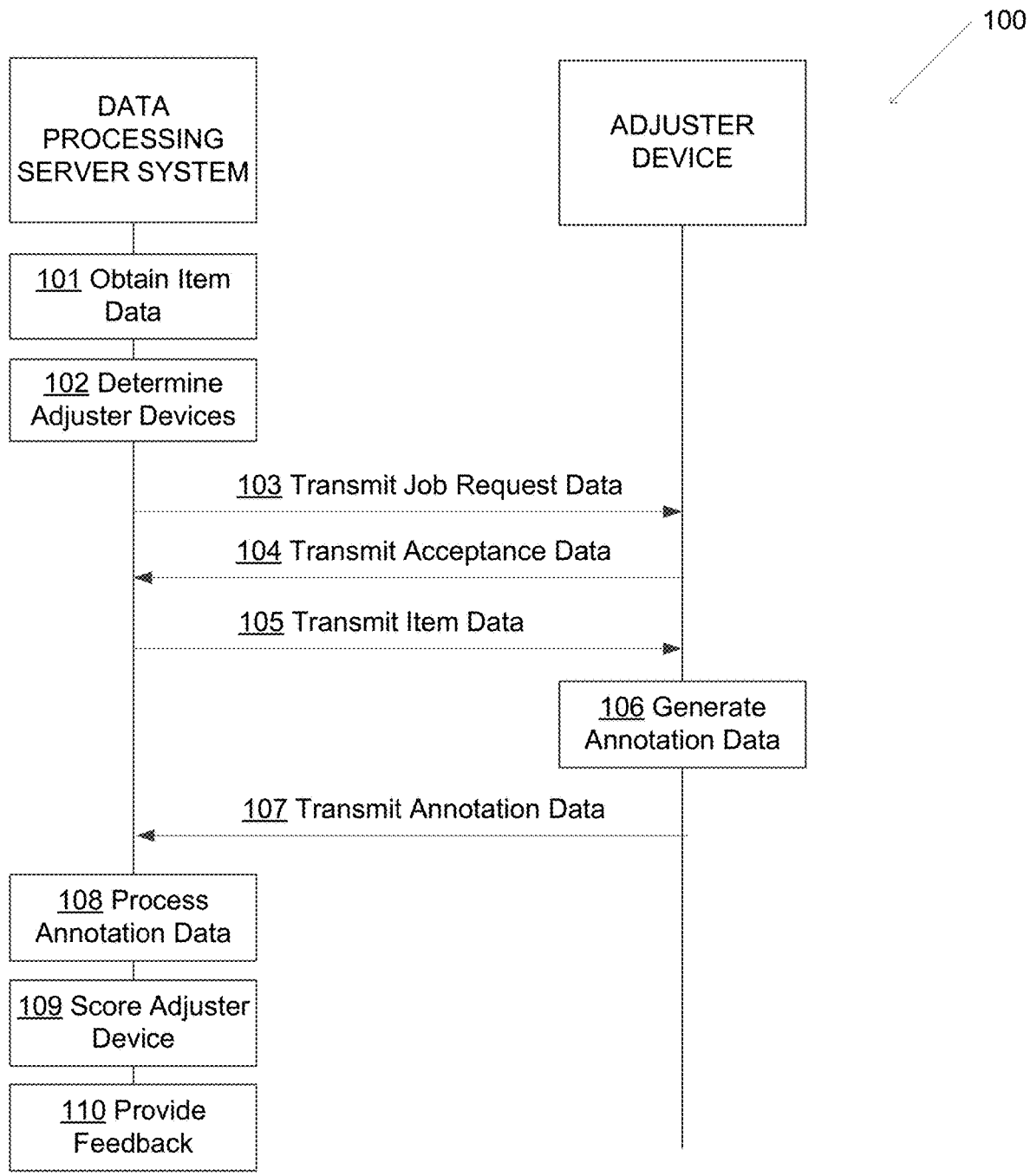
FIG. 1 illustrates an example event sequence in accordance with one or more aspects described herein.

In the following description of the various embodiments, reference is made to the accompanying drawings, which form a part hereof, and in which is shown by way of illustration, various embodiments of the disclosure that can be practiced. It is to be understood that other embodiments can be utilized.

As will be appreciated by one of skill in the art upon reading the following disclosure, various aspects described herein can be embodied as a method, a computer system, or a computer program product. Accordingly, those aspects can take the form of an entirely hardware embodiment, an entirely software embodiment, or an embodiment combining software and hardware aspects. Furthermore, such aspects can take the form of a computer program product stored by one or more computer-readable storage media having computer-readable program code, or instructions, embodied in or on the storage media. Any suitable computer-readable storage media can be utilized, including hard disks, CD-ROMs, optical storage devices, magnetic storage devices, and/or any combination thereof. In addition, various signals representing data or events as described herein can be transferred between a source and a destination in the form of electromagnetic waves traveling through signal-conducting media such as metal wires, optical fibers, and/or wireless transmission media (e.g., air and/or space).

As will be discussed more fully herein, arrangements described herein are directed to determining an adjuster device to be assigned to process a particular claim. A mobile device can transmit data (e.g., images, video, etc.) related to damage associated with an item. A claims processing server can manage analysis of damage associated with the item, generate an adjustment request, and provide the adjustment request to a variety of adjuster devices. In a variety of embodiments, adjuster devices are determined based on a third-party database of certifications associated with particular adjuster devices. An adjuster device can accept or decline the adjustment request. On accepting a request, the adjuster device can be provided with a set of data describing damage to an item and a variety of annotations can be applied to the data. In a variety of embodiments, multiple adjuster devices can review the same claim and a final claim outcome can be determined based on the multiple reviews. In many embodiments, machine classifiers can process the set of data to identify particular features within the data. Scoring data can be generated, based on annotations provided by other adjuster devices and/or machine classifiers that reflects the adjuster device's skill at identifying features within the data and annotating the data. Claims can be assigned to adjuster devices based on the score assigned to the adjuster device.

Crowdsourcing damage reports is an innovative way of writing damage reports. For example, the collective group enables hundreds or even thousands of adjusters to provide damage reports to a variety of different users based on photos of damaged vehicles, etc. By way of an example, a data processing server system can obtain item data describing damage to a bumper. However, it should be noted that any damage to any item, such as fire or water damage to a house, or damage to an electronic device, can be described in the obtained item data. A variety of features can be determined in the item data, such as a dent and a scratch on the bumper or scorch marks on the siding of the house. These features can be described in one or more annotation tasks. Requests to perform an annotation task can be sent to a number of adjuster devices. Various tasks and/or subtasks can be provided to different adjuster devices and multiple adjuster devices can be provided with the same task and/or subtask. The adjuster devices to which the requests are sent can be determined based on a variety of criteria, such as the skill of the adjuster device in annotating particular types of items (e.g. vehicles, real property, etc.) and/or annotating particular types of features (e.g. crash damage, fire damage, water damage, etc.) An adjuster device can accept an annotation request and a data processing server system can send the annotation task to one or more of the adjuster devices that accepted the request for the annotation task. In this way, one or more adjuster devices can be assigned to annotate the item data for a particular incident and, in a variety of embodiments, the annotation of the item data can be subdivided into a variety of tasks and each task can be performed by an adjuster device having a high skill in annotating the particular features indicated in the assigned task. The adjuster devices can then be scored based on their performance in performing the assigned tasks based on a variety of metrics including but not limited to, the time needed to complete the task, a comparison of the annotations provided by the adjuster device to annotations generated by a machine classifier and/or other adjuster devices (such as when the same annotation task is provided to multiple adjuster devices), and/or a comparison of the provided annotations to the corrective action actually taken in repairing and/or replacing the damaged items. For example, if an adjuster device indicates that a bumper requires replacement and the repair shop repairs and repaints the bumper, the adjuster device may receive a lower score for the annotation task vs a second adjuster device (and/or machine classifier) that provided an annotation that the bumper should be repainted. The scoring data can be used to determine which adjuster devices are assigned to future annotation tasks. For example, adjuster devices with scores indicating that the adjuster device does not provide annotations consistent with other adjuster devices can be excluded from being offered future annotation tasks for a particular class of task. These and various other arrangements will be described more fully herein.

Obtaining and Processing Item Data

FIG. 1 illustrates an example sequence for obtaining data describing an item, determining one or more adjuster devices, providing data to the adjuster devices, obtaining annotation data, and scoring the adjuster devices according to one or more aspects described herein. The sequence illustrated in FIG. 1 is merely an example sequence and various other steps can be included, or steps shown can be omitted, without departing from the invention. Further, one or more processes shown and/or described with respect to FIG. 1 can be performed in real-time or near real-time.

With reference to event sequence 100 shown in FIG. 1, in step 101, item data can be obtained. The item data can include a variety of features. For example, the item data can include multiple images of an item and the features can include damage to the item. Any class of item, such as a vehicle, house, mobile device, etc., can be shown in the item data. The item data can include multiple images of a particular feature from multiple perspectives.

In step 102, the data processing server system can determine one or more adjuster devices. The adjuster devices can be determined based on the type of item described by the item data and/or a score associated with the adjuster device. In a variety of embodiments, the score for an adjuster device is based on the adjuster's skill in annotating item data for a particular class of item. In many embodiments, the score for an adjuster device is based on the adjuster's historical skill in identifying and annotating features indicated in item data. Multiple scores can be associated with a particular adjuster device. In several embodiments, the adjuster devices can be determined based on information received from a third-party system. The third-party information can indicate particular certifications and/or ratings associated with one or more adjuster devices. For example, a certification can indicate that an adjuster device has been independently qualified to annotate a particular class of item data. In a number of embodiments, the third-party information is used to calculate one or more scores associated with an adjuster device.

In step 103, the data processing server system can transmit job request data to the determined adjuster devices. The job request data can indicate that item data is available for annotation. The job request data can also indicate the class of item to be indicated, the number of items of data available, a compensation metric for providing annotation data, a period for providing annotations, and/or any other data as appropriate. The job request data can be sent to particular sets of adjuster devices based on specific subtasks indicated in the job request data. The subtasks can be determined based on a subclass of features present in the item data. The sets of adjuster devices for a subtask can be determined based on the expertise in the adjuster devices at annotating the particular subclass of features.

In step 104, one or more adjuster devices can transmit acceptance data to the data processing server system. The acceptance data can indicate a time at which the job request data was accepted, an identifier for the adjuster device, a compensation request for providing annotation, and/or any other data responsive to the job request data.

In step 105, item data can be transmitted to one or more adjuster devices. The item data can be transmitted to some or all of the adjuster devices that transmitted acceptance data to the data processing server system in step 104. In a variety of embodiments, the data processing server system transmits the item data to the adjuster device transmitting acceptance data and having the highest score or scores out of all adjuster devices that transmitted acceptance data. In many embodiments, the data processing server system transmits the item data to multiple adjuster devices having a score exceeding a threshold value. The threshold value can be pre-determined and/or determined automatically based on the specific annotation task and/or scores for the adjuster devices. For example, a difficulty can be associated with annotating particular features and/or particular classes of item data. The threshold value can be automatically determined based on the difficulty associated with the task. The threshold value can also be automatically determined based on the scores associated with the adjuster devices accepting the task. For example, if five adjuster devices accept the task with scores of 100, 75, 50, 25, and 0, the item data and associated annotation tasks can be transmitted to the adjuster devices having a score exceeding the average score of 50. In a number of embodiments, the data processing server system transmits the item data to multiple adjuster devices having compensation metric below a threshold value.

In step 106, the adjuster device can generate annotation data. The annotation data can describe one or more features represented in the item data. In many embodiments, the annotation data indicates a type of item, a type of damage to the item, and a severity indicator of the damage. In a number of embodiments, the annotation data includes an indication of a repair cost and/or a replacement cost for the item. In several embodiments, the annotation data includes a recommended course of action (e.g. repair, replace, etc.) with respect to a particular feature of a particular item.

In step 107, the adjuster device can transmit annotation data to the data processing server system. The transmitted annotation data can include a time at which the annotations were generated and/or a time at which the annotation data was transmitted.

In step 108, annotation data can be processed. The annotation data can be processed to combine annotation data received from multiple adjuster devices to generate an overall set of annotation data for the obtained item data. For example, the item data can be divided into multiple subtasks transferred to different adjuster devices. The combined annotations for each subtask result in a set of annotations for the obtained item data. In many embodiments, the annotation data can be processed by an adjuster device. In several embodiments, the received annotation data can be anonymized before processing, particularly when the processing of the combined annotation results is performed by an adjuster device.

In step 109, the data processing server system can score the performance of the adjuster device. The score can be calculated based on the time elapsed between transmitting the item data to the adjuster device and the time at which the adjuster device transmitted the annotation data. The score can be calculated based on the accuracy of the adjuster device in identifying features within the item data. The score can be calculated based on the assessments of severity, type of damage, estimated cost of repair/replacement, recommendations, and/or any other features of the item data and/or annotation data as appropriate. In a variety of embodiments, the score is calculated by comparing annotation data received from multiple adjuster devices and/or a machine classifier. Techniques for scoring adjuster devices are described in more detail with respect to FIG. 4.

In step 110, feedback can be provided. The feedback can be provided to an adjuster device and/or any other computing device as described herein. The feedback can be generated based on the score for the adjuster device. The feedback can include aggregate scores generated based on scores for multiple adjuster devices. The feedback can also include a variety of performance metrics for the annotation device and/or suggestions to raise the score for the adjuster device relative to the aggregate scores. In several embodiments, the feedback is displayed using the adjuster device.

Determining Adjuster Devices

Figure 2:
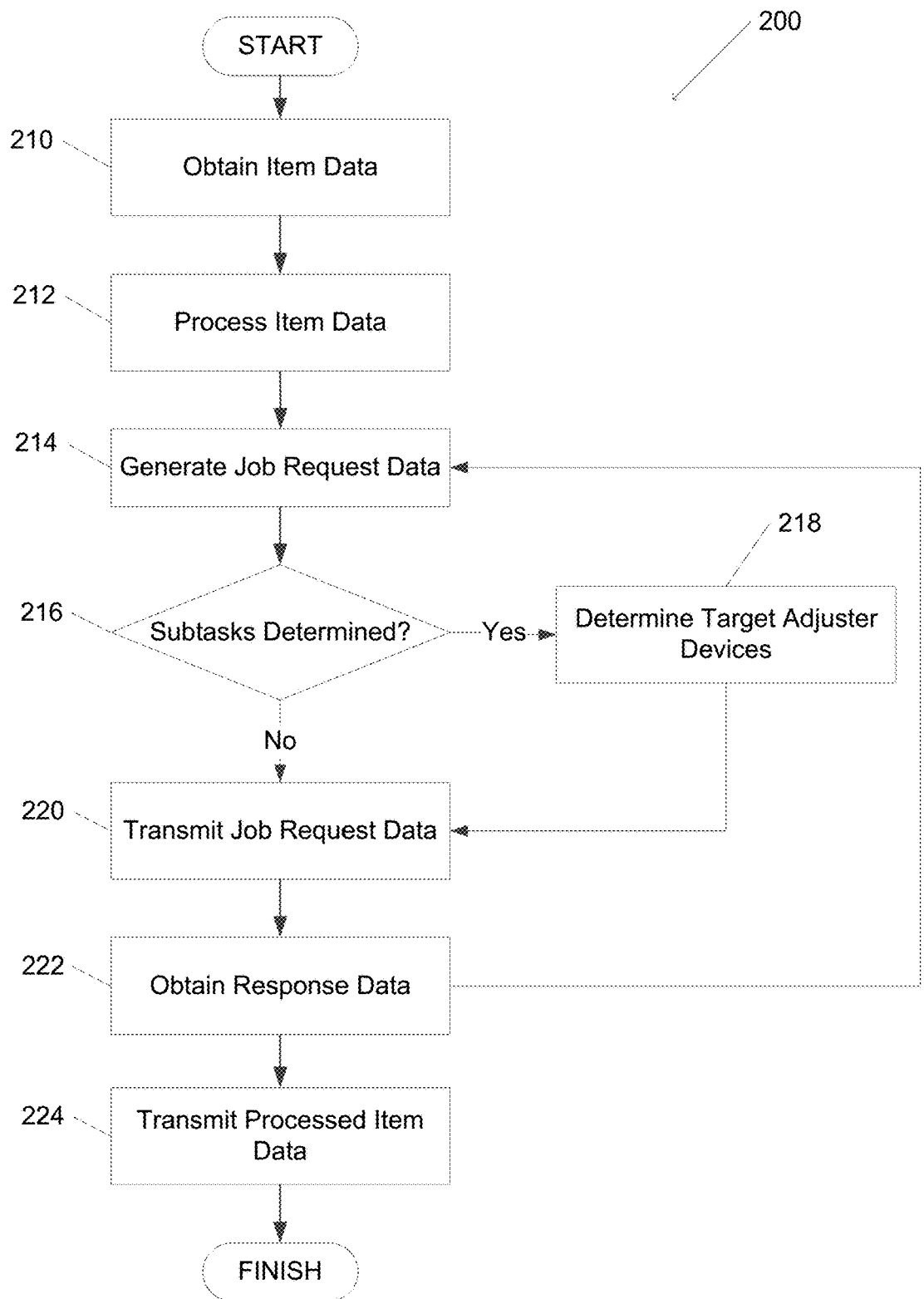
FIG. 2 illustrates a flow chart for determining an adjuster device in accordance with one or more aspects described herein.

FIG. 2 illustrates a flow chart for determining an adjuster device in accordance with one or more aspects described herein. Some or all of the steps of process 200 may be performed using one or more computing devices as described herein. In a variety of embodiments, some or all of the steps described below may be combined and/or divided into sub-steps as appropriate.

Item data can be obtained (210). The obtained item data can include data (e.g., images, video, text, audio, etc.) describing an item (e.g., a vehicle, house, personal property, etc.). The item data can describe property that has been involved in an accident. In a variety of embodiments, the item data includes at least three images of each feature (e.g. damage to an item) from different perspectives, lighting conditions, and the like. In many embodiments, the item data includes metadata indicating relationships between particular pieces of item data, such as an indication that multiple pieces of item data correspond to the same feature.

Item data can be processed (212). The item data can be processed to anonymize the item data. In a variety of embodiments, the item data is processed to remove identifying data such as vehicle identification numbers, serial numbers, license plate numbers, images of individuals, background images, and the like. In several embodiments, processing the item data includes generating metadata indicating relationships between particular pieces of item data. A variety of image processing techniques can be utilized to identify features within the image data and determine when the identified features in different pieces of image data correspond to the same feature on the same object.

Job request data can be generated (214). The job request data can include a variety of data describing the item data and/or one or more annotation tasks associated with the item data. Data describing the item data can include the type (or types) of items described in the item data, date/time information, location information, and the like. Annotation tasks can include a compensation metric, a time period in which the annotation tasks are to be completed, a difficulty metric associated with the annotation task, and the like. Annotation tasks can be determined for a particular subset of the item data. In several embodiments, the item data can include a variety of classes of items and/or a variety of features associated with those items. Subtasks can be determined based on the item classes and/or feature classes. For example, if the item data shows damage to a door and to a bumper of an automobile, one subtask can be created for the item data corresponding to the door and one subtask can be created for the item data corresponding to the bumper. However, it should be noted that any number of subtasks can be created for any class of item data.

When subtasks are determined (216), target adjuster devices can be determined (218). The target adjuster devices can be determined based on a specific expertise (as indicated by a score and/or information provided by a third-party system as described herein) in providing annotations for a particular class of item data and/or particular features.

Job request data can be transmitted (220). The job request data can be transmitted to one or more adjuster devices. The adjuster devices can be determined based on the job request data, item data, and/or a score associated with the adjuster device. In many embodiments, the score for an adjuster device is based on the adjuster's skill in annotating item data for a particular class of item as described in more detail herein. In a number of embodiments, the adjuster devices can be determined based on information received from a third-party system indicating particular licenses, certifications, and/or ratings associated with one or more adjuster devices for one or more classes of item data. In a variety of embodiments, the job request data is transmitted to a set of target adjuster devices determined for a particular subtask.

Response data can be obtained (222). The response data can indicate that an adjuster device is accepting the task(s) indicated in the job request data. This acceptance data can be obtained from one or more of the adjuster devices to which job request data was transmitted. The acceptance data can include a date/time at which the request was accepted, compensation metrics for the task, an anticipated completion time for the annotation tasks, and the like. The compensation metrics and/or anticipated completion time indicated in the acceptance data can be different than the compensation metrics and/or time period indicated in the job request data. In several embodiments, the response data can indicate that an adjuster device declined the tasks indicated in the job request data along with an indication of why the job request data was declined. For example, an adjuster device may not have the bandwidth to take on a task, the compensation metric may be too low, the adjuster device can lack expertise in annotating a particular class of item, and the like. In many embodiments, additional job request data can be generated (214) and transmitted based on adjuster devices declining the previously generated requests. For example, a compensation metric can be increased for a particular task to provide an incentive for an adjuster device to accept the task.

Processed item data can be transmitted (224). The processed item data can be transmitted to one or more adjuster devices. The one or more adjuster devices can be determined based on the acceptance data, job request data, and/or a score associated with the adjuster devices. For example, the adjuster devices can be determined by providing a compensation metric below the compensation metric indicated in the job request data, by providing an anticipated completion time faster than the time frame indicated in the job request data, and the like. In many embodiments, differences between the job request data and acceptance data can be scored and determining adjuster devices can be based on a weighted score calculated based on the scored differences and a score associated with the adjuster device. In several embodiments, processed item data is transmitted to adjuster devices having a score exceeding a threshold value, which can be pre-determined and/or determined dynamically. For example, processed item data can be transmitted to adjuster devices providing an acceptance response for an annotation task and having a score in the top ninety percent of scores for adjuster devices providing acceptance data for the task. In this way, low performing adjuster devices can be excluded from being assigned annotation tasks. The adjuster devices can be determined based on a total compensation metric for an adjuster device. The total compensation metric can be determined based on compensation awarded to an adjuster device across a variety of annotation tasks performed by the adjuster device over a particular period. In several embodiments, adjuster devices with a total compensation metric over a threshold value can be de-prioritized from being assigned particular annotation tasks. The threshold value can be pre-determined and/or determined automatically based on the total compensation metrics for a variety of adjuster devices, such as all adjuster devices that provide an acceptance for a particular annotation task and/or all adjuster devices present in a data annotation system.

Generating Annotation Data

Figure 3:
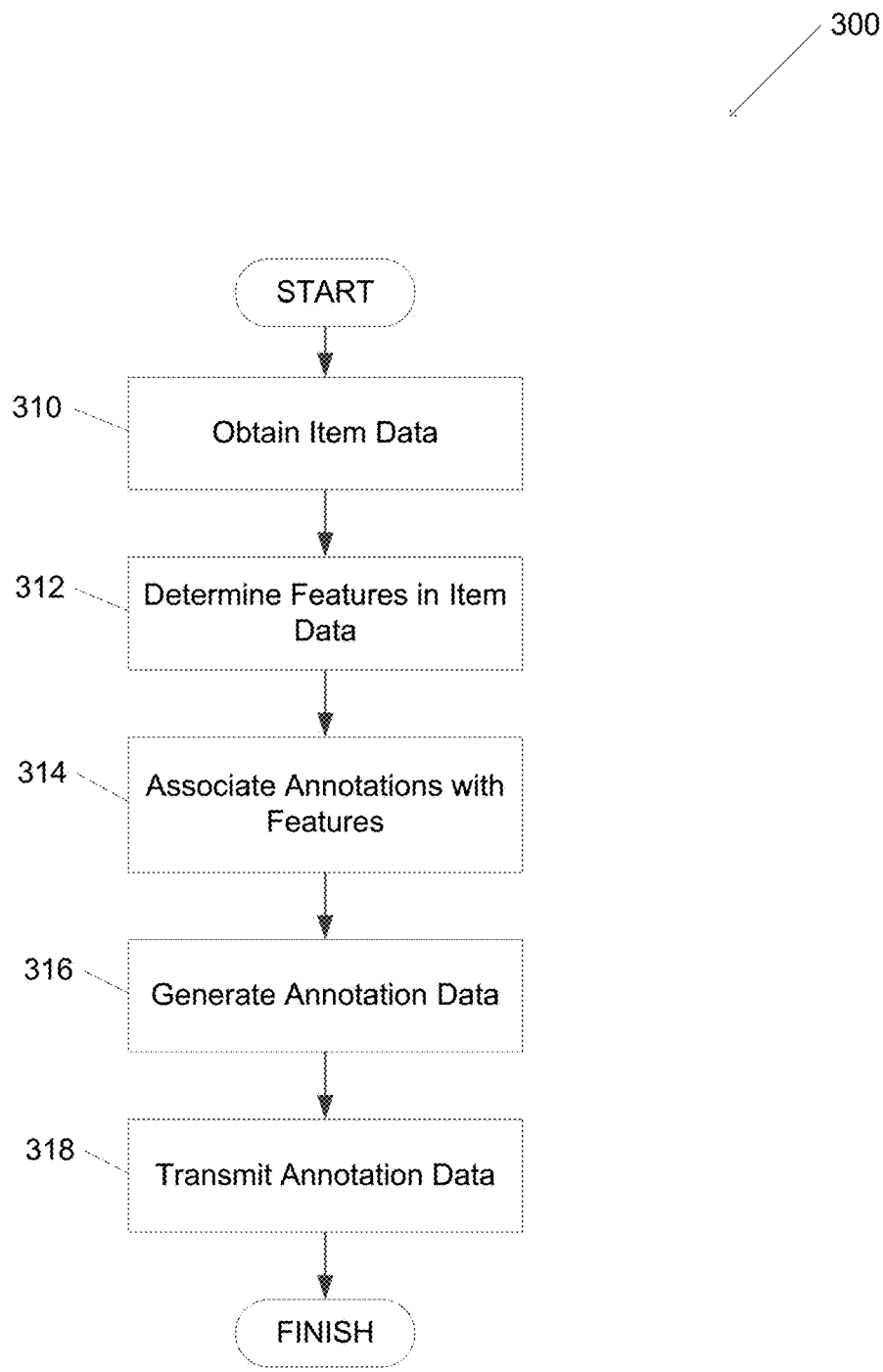
FIG. 3 illustrates a flow chart for generating annotation data in accordance with one or more aspects described herein.

FIG. 3 illustrates a flow chart for generating annotation data in accordance with one or more aspects described herein. Some or all of the steps of process 300 may be performed using one or more computing devices as described herein. In a variety of embodiments, some or all of the steps described below may be combined and/or divided into sub-steps as appropriate.

Item data can be obtained (310). The item data can include any data described herein, including the item data and/or processed item data as described herein. The item data can be obtained from a data annotation server system. In a variety of embodiments, the item data includes one or more images of an item that has been damaged.

Features in item data can be determined (312). Features in the item data can include damage occurring on an item. The damage to an item can be a generalized indication of a damaged area and/or a specific type of damage to the item. Types of damage include, but are not limited to, dent type damage, crack type damage, scratch type damage, and break type damage. The features can be determined by processing each piece of item data to identify anticipated features and then analyzing each anticipated feature to determine variations in the feature present in the item data relative to the anticipated feature. In several embodiments, differences between anticipated features and features present in the item data can be determined by identifying a class associated with the determined feature, obtaining an anticipated feature corresponding to the determined class, and calculating differences between the determined feature and the anticipated feature. For example, for break type damage to a window, item data can be processed to determine a window feature having a corresponding class window, an anticipated feature corresponding to the class can include a window frame with a clear pane of glass installed, and the feature present in the item data can include a broken window frame along with a pane of glass having several cracks and a hole. The feature present in the item data and the anticipated feature can be compared to automatically identify the breaks in the window frame and the damage to the pane of glass. In several embodiments, a feature in item data corresponds to a portion of an image showing the damage to the item.

Annotations can be associated (314) with the features. Annotation data associated with a feature can indicate a variety of data associated with the feature. In a number of embodiments, the annotation data includes a class associated with the feature. In many embodiments, the annotation data indicates a severity of damage to an item. For example, a particular feature can be damage of low severity, medium severity, or high severity. The severity associated with a feature can be based on a measure of the extent of damage and/or the cost to repair or replace the item. The annotation data can include a type of damage, a likely cause of damage, and/or an impact analysis for the damage.

Annotation data can be generated (316). The annotation data can include one or more annotations associated with a feature shown in one or more pieces of item data. The annotation data can also include a variety of other data, such as a cost for repairing the feature and a cost for replacing the feature. This data can be automatically determined based on the annotations. In a variety of embodiments, a database can store part information, a cost for repairing the part, and a cost for replacing the part. The feature data can be mapped to a particular part and the associated costs can be automatically included in the annotation data.

Annotation data can be transmitted (318). The annotation data and/or the associated item data can be transmitted to a variety of devices, such as a data annotation server system.

Figure 5:
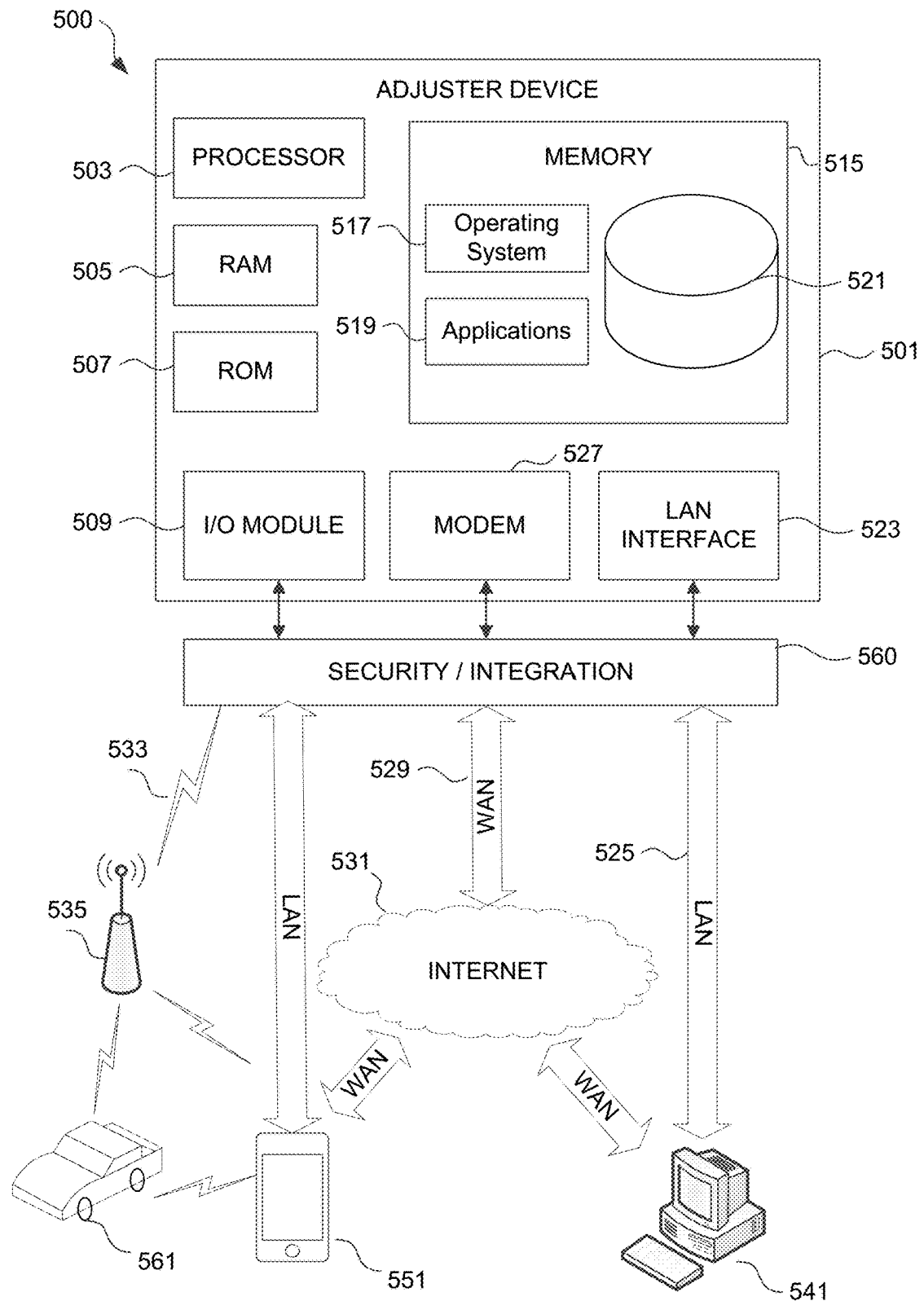
FIG. 5 illustrates an example operating environment in which one or more aspects described herein can be implemented.
Figure 6:
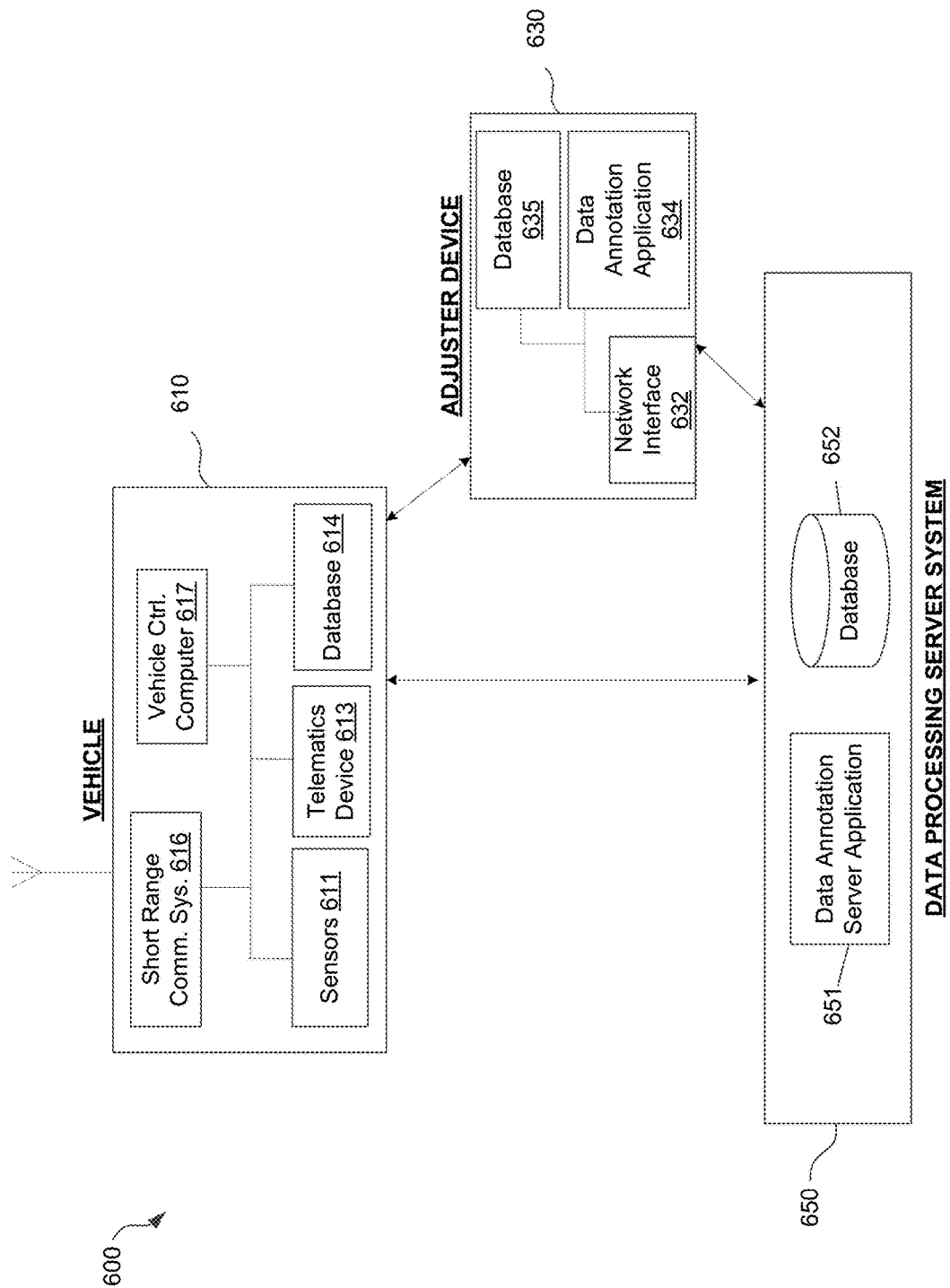
FIG. 6 illustrates an example claims processing system in accordance with one or more aspects described herein.

The annotation data can be transmitted via any of a variety of communications channels, such as those described with respect to FIG. 5 and FIG. 6. In many embodiments, compensation can be automatically provided to the adjuster device based on the compensation metric associated with the item data when the annotation data is transmitted.

Scoring Adjuster Devices

Figure 4A:
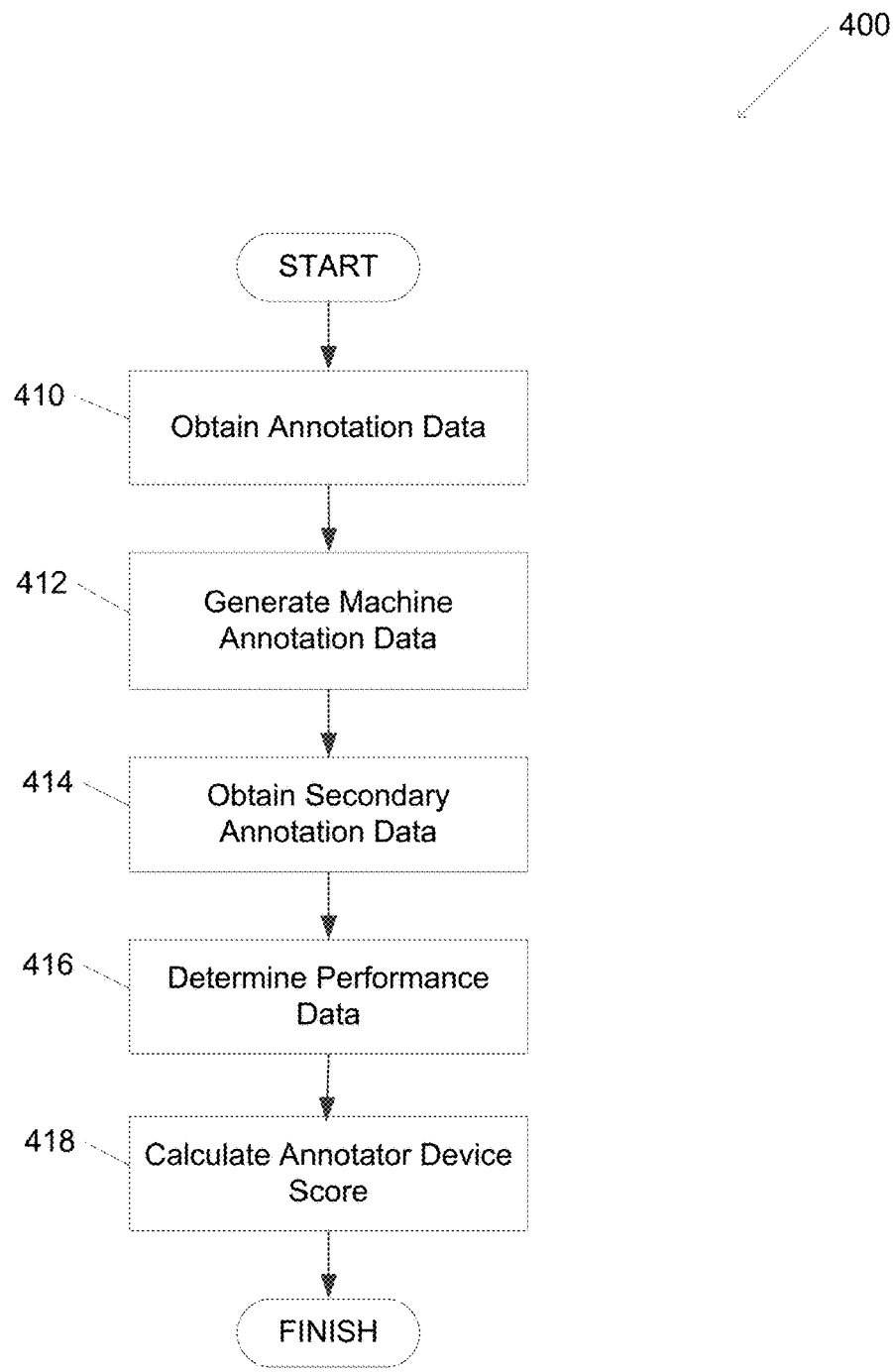
FIG. 4A-B illustrates flow charts for scoring adjuster devices in accordance with one or more aspects described herein.

FIG. 4A illustrates a flow chart for scoring an adjuster device using a machine classifier in accordance with one or more aspects described herein. Some or all of the steps of process 400 may be performed using one or more computing devices as described herein. In a variety of embodiments, some or all of the steps described below may be combined and/or divided into sub-steps as appropriate.

Annotation data can be obtained (410). The annotation data can be obtained from an adjuster device. The annotation data can include a variety of annotations describing features present within a set of item data as described herein.

Machine annotation data can be generated (412). The item data associated with the annotation data can be provided to a machine classifier to generate a set of machine annotation data. The machine annotation data can include a set of features in the item data and a set of confidence metrics describing the likelihood that the feature is present in the item data. Any of a variety of machine classifiers can be utilized including (but not limited to) decision trees, k-nearest neighbors, support vector machines (SVM), neural networks (NN), recurrent neural networks (RNN), convolutional neural networks (CNN), and/or probabilistic neural networks (PNN). RNNs can further include (but are not limited to) fully recurrent networks, Hopfield networks, Boltzmann machines, self-organizing maps, learning vector quantization, simple recurrent networks, echo state networks, long short-term memory networks, bi-directional RNNs, hierarchical RNNs, stochastic neural networks, and/or genetic scale RNNs. In a number of embodiments, a combination of machine classifiers can be utilized, more specific machine classifiers when available, and general machine classifiers at other times can further increase the accuracy of predictions. The machine classifiers can be trained using a set of historical item data and annotation data describing the features in the historical item data.

Secondary annotation data can be obtained (414). The secondary annotation data can include annotation data provided by one or more adjuster devices separate from the adjuster device that provided (410) the annotation data. The secondary annotation data can include a variety of annotations describing features present within a set of item data as described herein.

Performance data can be determined (416). The performance data can be determined for the adjuster device providing the annotation data. The performance data can be based on, but is not limited to, a compensation metric associated with obtaining the annotation data, the time associated with generating the obtained annotation data, the accuracy of the annotation data, and/or the completeness of the annotation data. The completeness of the annotation data can be determined based on the number of features identified in the annotation data as compared to the number of features identified in the machine annotation data and/or secondary annotation data. The accuracy of the annotations can be determined based on the annotations describing the features (e.g. severity, cost to repair/replace, etc.) as compared to the specific annotations provided in the machine annotation data and/or secondary annotation data. In many embodiments, if the performance data indicates that the obtained annotation data is below a particular quality threshold, a secondary review can be initiated. The secondary review can include a manual review of the item data and/or initiating a second request for annotations as described herein with respect to FIG. 2. The performance data can be determined based on the accuracy recommendation made in the annotation data and an action performed with respect to the annotated item. For example, an adjuster device can recommend that the flooring in a home be replaced after experiencing flood damage, while the contractor fixing the home can determine that the flooring is experiencing minor damage and can just be cleaned. In this example, the provided recommendation is not accurate as a different action was taken to correct the item. Alternatively, multiple adjuster devices may have suggested that the flooring should have been replaced as opposed to being replaced, in which case the provided recommendation is not accurate as a different action was sufficient to correct the item.

Adjuster device scores can be calculated (418). The score for an adjuster device can be calculated based on the time elapsed between transmitting the item data to the adjuster device and the time at which the adjuster device transmitted the annotation data. The score can be calculated based on the completeness of the adjuster device in identifying features within the item data. The score can be calculated based on the accuracy of the adjuster device in providing annotations to the identified features. In a variety of embodiments, the score is calculated based on the performance data. The various aspects of the performance data can be weighted to calculate the score data for the adjuster device. The score data can also be based on a classification of the item data being annotated. In this way, the score data can identify particular classes of item data that a particular adjuster device is skilled at annotating.

Figure 4B:
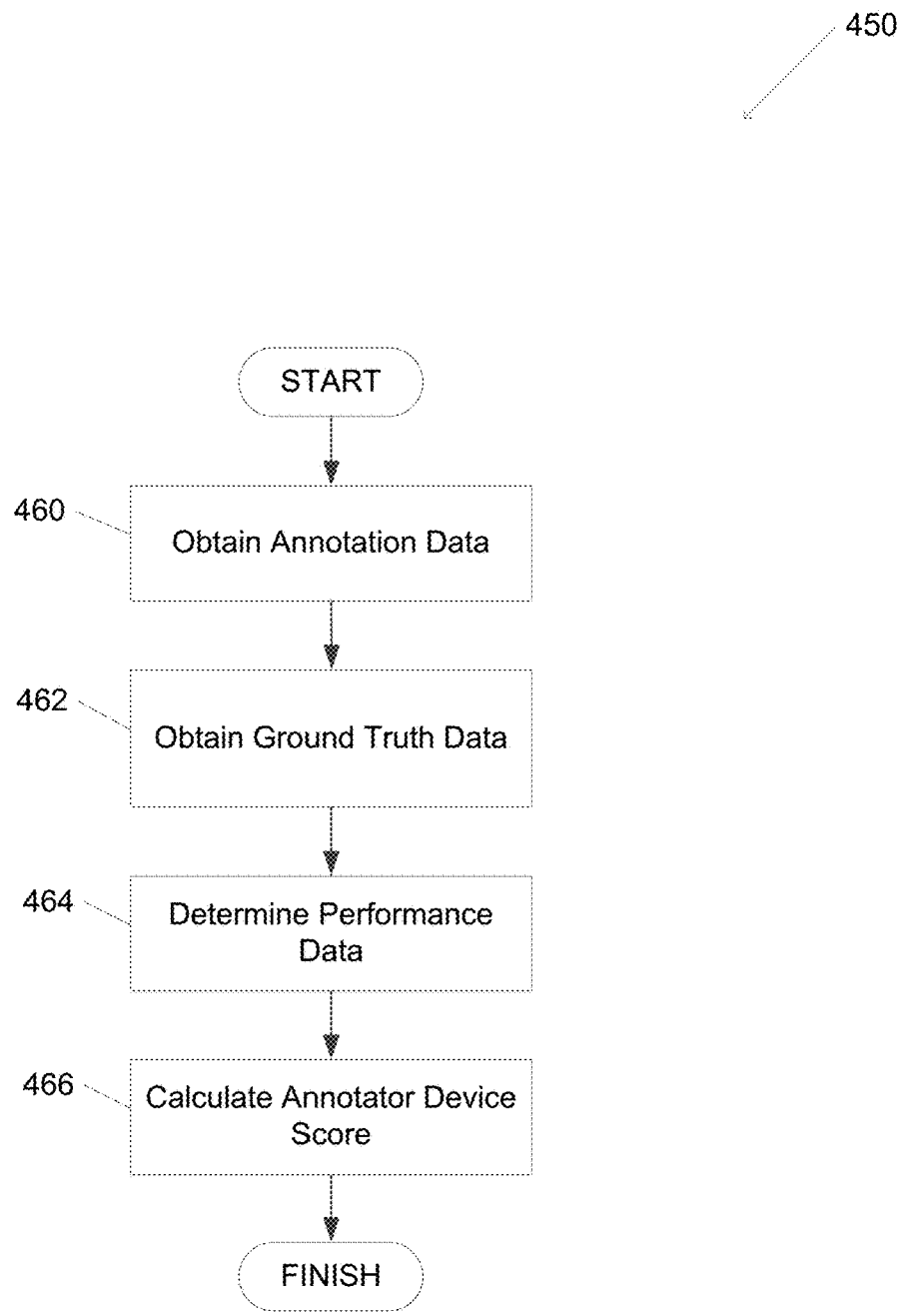

FIG. 4B illustrates a flow chart for scoring an adjuster device in accordance with one or more aspects described herein. Some or all of the steps of process 450 may be performed using one or more computing devices as described herein. In a variety of embodiments, some or all of the steps described below may be combined and/or divided into sub-steps as appropriate.

Annotation data can be obtained (460). The annotation data can be obtained from an adjuster device. The annotation data can include a variety of annotations describing features present within a set of item data as described herein. In a variety of embodiments, the annotation data is for a quality control task that is not indicated to the adjuster device. For example, an adjuster device may process ten annotation tasks per day. Out of the ten annotation tasks, nine may be for new tasks and one may be a quality control task provided to adjuster devices to evaluate the performance of the adjuster device. The quality control tasks can be randomly provided to the adjuster devices, provided based on a testing schedule, provided based on the number of annotation tasks performed by the adjuster device, provided based on the skill of the adjuster device, and the like.

Ground truth data can be obtained (462). The ground truth data can include a set of features present in the quality control task and ground truth labels for those features.

Performance data can be determined (464). The performance data can be determined for the adjuster device providing the annotation data. The performance data can be based on, but is not limited to, a compensation metric associated with obtaining the annotation data, the time associated with generating the obtained annotation data, the accuracy of the annotation data, and/or the completeness of the annotation data. The completeness of the annotation data can be determined based on the number of features identified in the annotation data as compared to the number of features present in the ground truth data. The accuracy of the annotations can be determined based on the annotations describing the features (e.g. severity, cost to repair/replace, etc.) as compared to the ground truth labels for those features indicated in the ground truth data. In many embodiments, if the performance data indicates that the obtained annotation data is below a particular quality threshold, a secondary review can be initiated. The secondary review can include a manual review of the item data and/or initiating a second request for annotations as described herein with respect to FIG. 2.

Adjuster device scores can be calculated (466). The score for an adjuster device can be calculated based on the time elapsed between transmitting the item data to the adjuster device and the time at which the adjuster device transmitted the annotation data. The score can be calculated based on the completeness of the adjuster device in identifying features within the item data. The score can be calculated based on the accuracy of the adjuster device in providing annotations to the features present in the quality control task. In a variety of embodiments, the score is calculated based on the performance data. The various aspects of the performance data can be weighted to calculate the score data for the adjuster device. The score data can also be based on a classification of the item data being annotated. In this way, the score data can identify particular classes of item data that a particular adjuster device is skilled at annotating.

Data Annotation Systems

FIG. 5 conceptually illustrates an adjuster device 501 in a data annotation system 500 in accordance with an embodiment of the invention. The adjuster device 501 can include a processor 503 for controlling overall operation of the adjuster device 501 and its associated components, including RAM 505, ROM 507, input/output module 509, and memory 515. The adjuster device 501, along with one or more additional devices (e.g., terminal 541, mobile device 551, and/or security and integration hardware, such as integration layer 560) can correspond to any of multiple systems or devices described herein, such as personal mobile devices, vehicle-based computing devices, insurance systems servers, internal data sources, external data sources, and/or other various devices in the data annotation system 500. These computing devices can be configured individually or in combination, as described herein, for obtaining data describing an item, identifying one or more adjuster devices to annotate the data, obtaining annotation data from the identified adjuster devices, scoring the performance of the adjuster devices, and the like.

Input/output (I/O) module 509 can include a microphone, keypad, touch screen, and/or stylus through which a user of the adjuster device 501 can provide input, and can also include one or more of speakers for providing audio output and a video display device for providing textual, audiovisual, and/or graphical output. Software can be stored within memory 515 and/or any other storage to provide instructions to processor 503 allowing adjuster device 501 to perform various actions. For example, memory 515 can store software used by the adjuster device 501, such as an operating system 517, application programs 519, and/or database 521. The various hardware memory units in memory 515 can include volatile and nonvolatile memory units, removable media, and/or non-removable media implemented in any method or technology for storage of information such as computer-readable instructions, data structures, program modules or other data. Certain devices and systems within data annotation systems can have minimum hardware requirements in order to support sufficient storage capacity, processing capacity, analysis capacity, network communication, etc. Memory 515 also can include one or more physical persistent memory devices and/or one or more non-persistent memory devices. Memory 515 can include, but is not limited to, random access memory (RAM) 505, read only memory (ROM) 507, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 503.

Processor 503 can include a single central processing unit (CPU), which can be a single-core or multi-core processor (e.g., dual-core, quad-core, etc.), or can include multiple CPUs. Processor(s) 503 and its associated components can allow the adjuster device 501 to execute a series of computer-readable instructions, for example, receive signals or transmissions including location information, vehicle operation information, scan for diagnostic codes, and the like, to determine a location of the vehicle, determine a cause of an issue associated with the vehicle, control amount and type of data received, and the like.

The mobile device 551 (e.g., a personal mobile device, vehicle-based system, insurance system server, data processing server system, etc.) can operate in a networked environment 500 supporting connections to one or more remote computers, such as terminal 541 and vehicle-based computing systems 561. Such terminals can be personal computers or servers 541 (e.g., home computers, laptops, web servers, database servers), mobile communication devices 551 (e.g., mobile phones, tablet computers, etc.), vehicle-based computing systems 561 (e.g., on-board vehicle systems, telematics devices, mobile phones, and/or other devices within vehicles), and the like, each of which can include some or all of the elements described above with respect to the adjuster device 501. The network connections depicted in FIG. 5 include a local area network (LAN) 525, a wide area network (WAN) 529, and a wireless telecommunications network 533, but can also include fewer or additional networks. The adjuster device 501 can be connected to the LAN 525 through a network interface or adapter 523. The adjuster device 501 can include a modem 527 or other means for establishing communications over the WAN 529, such as network 531 (e.g., the Internet). The adjuster device 501 can include one or more transceivers, digital signal processors, and additional circuitry and software for communicating with wireless computing devices 551 and 561 (e.g., mobile phones, portable customer computing devices, vehicle-based computing devices and systems, etc.) via one or more network devices 535 (e.g., base transceiver stations) in the wireless telecommunications network 533. It should be noted that, in a variety of embodiments, the adjuster device 501 is implemented using mobile device 551. In many embodiments, the adjuster device 501 communicates with mobile device 551 to cooperatively implement and perform the systems and methods described herein.

Also illustrated in FIG. 5 is a security and integration layer 560, through which communications are sent and managed between the adjuster device 501 (e.g., a personal mobile device, a vehicle-based computing device, a data processing server system or computing platform, an intermediary server and/or external data source servers, etc.), the external devices (541, 551, and 561), and remote networks (525, 529, and 533). The security and integration layer 560 can include one or more separate computing devices, such as web servers, authentication servers, and/or various networking components (e.g., firewalls, routers, gateways, load balancers, etc.), having some or all of the elements described above with respect to the adjuster device 501. As an example, a security and integration layer 560 of an adjuster device 501 can include a set of web application servers configured to use secure protocols and to insulate the adjuster device 501 from external devices 541, 551, and 561. In some cases, the security and integration layer 560 can correspond to a set of dedicated hardware and/or software operating at the same physical location and under the control of same entities as adjuster device 501. For example, security and integration layer 560 can correspond to one or more dedicated web servers and network hardware in a vehicle and driver information datacenter or in a cloud infrastructure. The security and integration layer 560 can correspond to separate hardware and software components which can be operated at a separate physical location and/or by a separate entity.

As discussed herein, the data transferred to and from various devices in data annotation system 500 can include secure and sensitive data, such as confidential vehicle operation data, insurance policy data, confidential user data from drivers and passengers in vehicles, and annotation data. Therefore, it can be desirable to protect transmissions of such data using secure network protocols and encryption and to protect the integrity of the data when stored on the various devices within a system, such as mobile devices, vehicle-based devices, insurance servers, external data source servers, or other computing devices in the data annotation system 500, using the security and integration layer 560 to authenticate users and restrict access to unknown or unauthorized users. In various implementations, security and integration layer 560 can provide, for example, a file-based integration scheme or a service-based integration scheme for transmitting data between the various devices in data annotation system 500. Data can be transmitted through the security and integration layer 560 using various network communication protocols. Secure data transmission protocols and/or encryption can be used in file transfers to protect the integrity of the data, for example, File Transfer Protocol (FTP), Secure File Transfer Protocol (SFTP), and/or Pretty Good Privacy (PGP) encryption. In other examples, one or more web services can be implemented within the various adjuster devices 501 in the data annotation system 500 and/or the security and integration layer 560. Web services can be accessed by authorized external devices and users to support input, extraction, and manipulation of the data between the various devices in the data annotation system 500. Web services built to support a personalized display system can be cross-domain and/or cross-platform, and can be built for enterprise use. Such web services can be developed in accordance with various web service standards, such as the Web Service Interoperability (WS-I) guidelines. In some examples, a driver data, vehicle data, location data, breakdown issue data and/or breakdown data analysis web service, or the like, can be implemented in the security and integration layer 560 using the Secure Sockets Layer (SSL) or Transport Layer Security (TLS) protocol to provide secure connections between adjuster devices 501 and external devices 541, 551, and 561. SSL or TLS can use HTTP or HTTPS to provide authentication and confidentiality. In other examples, such web services can be implemented using the WS-Security standard, which provides for secure SOAP messages using XML encryption. In still other examples, the security and integration layer 560 can include specialized hardware for providing secure web services. Secure network appliances in the security and integration layer 560 can include built-in features such as hardware-accelerated SSL and HTTPS, WS-Security, and firewalls. Such specialized hardware can be installed and configured in the security and integration layer 560 in front of the web servers, so that any external devices can communicate directly with the specialized hardware.

Various elements within memory 515 or other components in the data annotation system 500 can include one or more caches, for example, CPU caches used by the processor 503, page caches used by the operating system 517, disk caches of a hard drive, and/or database caches used to cache content from database 521. A CPU cache can be used by one or more processors in the processor 503 to reduce memory latency and access time. A processor 503 can retrieve data from or write data to the CPU cache rather than reading/writing to memory 515, which can improve the speed of these operations. A database cache can be created in which certain data from a database 521 is cached in a separate smaller database on an application server separate from the database server (e.g., at a personal mobile device, vehicle-based devices, intermediary network device or cache device, etc.). For instance, in a multi-tiered application, a database cache on an application server can reduce data retrieval and data manipulation time by not needing to communicate over a network with a back-end database server. These types of caches and others can be included in various embodiments, and can provide potential advantages in certain implementations of data annotation systems, such as faster response times and less dependence on network conditions when transmitting and receiving driver information, vehicle information, location information, roadside assistance issue information, and the like.

It will be appreciated that the network connections shown are illustrative and other means of establishing a communications link between the computers can be used. The existence of any of various network protocols such as TCP/IP, Ethernet, FTP, HTTP and the like, and of various wireless communication technologies such as GSM, CDMA, WiFi, LTE, and WiMAX, is presumed, and the various computing devices in data annotation system components described herein can be configured to communicate using any of these network protocols or technologies.

Additionally, one or more application programs 519 can be used by the various adjuster devices 501 within the data annotation system 500 (e.g., vehicle data, driver data, location data, roadside assistance issue data, and/or data annotation applications, etc.), including computer executable instructions for receiving and analyzing various signals or transmissions including location information, vehicle operating data, other vehicle operating data, and the like, determining a location of a vehicle, determining a cause of an issue, controlling an amount or type of data transmitted or received and the like.

FIG. 6 is a diagram of a data annotation system 600. The data annotation system 600 includes a vehicle 610 (e.g., the damaged item being evaluated), an adjuster device 630, a data processing server system 650, and additional related components. However, it should be noted that any item, including items other than vehicles, can be evaluated as described herein. The components of the data annotation system 600, individually or using communication and collaborative interaction, can obtain data describing damage to an item, obtain annotations of the damage to the item, control an amount or type of data received and/or processed, and/or generate score data describing the performance of the adjuster device. To perform such functions, the components shown in FIG. 6 each can be implemented in hardware, software, or a combination of the two. Additionally, each component of the data annotation system 600 can include a computing device (or system) having some or all of the structural components described herein.

Vehicle 610 in the data annotation system 600 can be, for example, an automobile, a motorcycle, a scooter, a bus, a recreational vehicle, a boat, or other vehicle for which vehicle data, location data, driver data (or operator data), operational data and/or other driving data (e.g., location data, time data, weather data, etc.) can be collected and/or analyzed. The vehicle 610 includes sensors 611 capable of detecting and recording various conditions at the vehicle and/or operational parameters of the vehicle. For example, sensors 611 can detect and store data corresponding to the vehicle's location (e.g., GPS coordinates), time, travel time, speed and direction, rates of acceleration or braking, gas mileage, and specific instances of sudden acceleration, braking, swerving, and distance traveled. Sensors 611 also can detect and store data received from the vehicle's 610 internal systems, such as impact to the body of the vehicle, air bag deployment, tire status, headlights usage, brake light operation, door opening and closing, door locking and unlocking, cruise control usage, hazard lights usage, windshield wiper usage, horn usage, turn signal usage, seat belt usage, phone and radio usage within the vehicle, autonomous driving system usage, maintenance performed on the vehicle, and other data collected by the vehicle control computer 617, including the vehicle on-board diagnostic systems (OBD, OBD II).

Additional sensors 611 can detect and store the external driving conditions, for example, external temperature, rain, snow, light levels, and sun position for driver visibility. For example, external cameras and proximity sensors 611 can detect other nearby vehicles, vehicle spacing, traffic levels, road conditions, traffic obstructions, animals, cyclists, pedestrians, and other conditions that can factor into a roadside assistance analysis. Sensors 611 also can detect and store data relating to moving violations and the observance of traffic signals and signs by the vehicle 610. Additional sensors 611 can detect and store data relating to the maintenance of the vehicle 610, such as the engine status, oil level, engine coolant temperature, odometer reading, the level of fuel in the fuel tank, engine revolutions per minute, software upgrades, and/or tire pressure.

Sensors 611 also can include cameras and/or proximity sensors capable of recording additional conditions inside or outside of the vehicle 610. Sensors 611 can obtain image data showing damage to the vehicle 610 and/or items in the environment surrounding the vehicle 610. Internal cameras can detect conditions such as the number of the passengers and the types of passengers (e.g. adults, children, teenagers, pets, etc.) in the vehicles, and potential sources of driver distraction within the vehicle (e.g., pets, phone usage, and unsecured objects in the vehicle). Sensors 611 also can be configured to collect data identifying a current driver from among a number of different possible drivers, for example, based on driver's seat and mirror positioning, driving times and routes, radio usage, etc. Voice/sound data along with directional data also can be used to determine a seating position within a vehicle 610. Sensors 611 also can be configured to collect data relating to a driver's movements or the condition of a driver. For example, vehicle 610 can include sensors that monitor a driver's movements, such as the driver's eye position and/or head position, etc. Additional sensors 611 can collect data regarding the physical or mental state of the driver, such as fatigue or intoxication. The condition of the driver can be determined through the movements of the driver or through other sensors, for example, sensors that detect the content of alcohol in the air or blood alcohol content of the driver, such as a breathalyzer, along with other biometric sensors.

Sensors 611 also can collect information regarding the driver's route choice, whether the driver follows a given route, and to classify the type of trip (e.g. commute, errand, new route, etc.) and type of driving (e.g., continuous driving, parking, stop-and-go traffic, etc.). In certain embodiments, sensors 611 and/or cameras can determine when and how often the vehicle 610 stays in a single lane or strays into another lane. A Global Positioning System (GPS), locational sensors positioned inside the vehicle 610, and/or locational sensors or devices external to the vehicle 610 can be used to determine the route, speed, lane position, road-type (e.g. highway, entrance/exit ramp, residential area, etc.) and other vehicle position/location data.

The data collected by sensors 611 can be stored, for example by a database 614 integrated into the vehicle, and/or can be transmitted to one or more external devices. For example, as shown in FIG. 6, sensor data can be transmitted to one or more remote computing devices, such as adjuster device 630, data processing server system 650, and/or other remote devices. The data can be transmitted by telematics device 613.

As shown in FIG. 6, the data collected by sensors 611 can be transmitted to data processing server system 650, adjuster device 630, and/or additional external servers and devices via telematics device 613. As discussed herein, the telematics device 613 can receive vehicle operation data and driving data from vehicle sensors 611, and can transmit the data to one or more external computer systems (e.g., data processing server system 650 of an insurance provider, financial institution, or other entity) over a wireless transmission network. Telematics device 613 can also be configured to detect or determine additional types of data relating to real-time driving and the condition of the vehicle 610. The telematics device 613 can also store the type of vehicle 610, for example, the make, model, trim (or sub-model), year, and/or engine specifications, as well as other information such as vehicle owner or driver information, insurance information, and financing information for the vehicle 610. In the example shown in FIG. 6, telematics device 613 can receive vehicle driving data from vehicle sensors 611, and can transmit the data to a data processing server system 650. However, in other examples, one or more of the vehicle sensors 611 or systems can be configured to receive and transmit data directly from or to a data processing server system 650 without using a telematics device. For instance, telematics device 613 can be configured to receive and transmit data from certain vehicle sensors 611 or systems, while other sensors or systems can be configured to directly receive and/or transmit data to a data processing server system 650 without using the telematics device 613. Thus, telematics device 613 can be optional in certain embodiments. In a variety of embodiments, a mobile device is capable of capturing and/or generating any of the data obtained by a telematics device without a connection to the telematics device.

Vehicle 610 can further include a short-range communication system 616. The short-range communication system 616 can be vehicle-based data transmission systems configured to transmit vehicle operational data to other nearby vehicles, and to receive vehicle operational data from other nearby vehicles (or any other item). In some examples, the short-range communication system 616 can use the dedicated short-range communications (DSRC) protocols and standards to perform wireless communications between vehicles. In the United States, 75 MHz in the 5.850-5.925 GHz band have been allocated for DSRC systems and applications, and various other DSRC allocations have been defined in other countries and jurisdictions. However, short-range communication system 616 need not use DSRC, and can be implemented using other short-range wireless protocols in other examples, such as WLAN communication protocols (e.g., IEEE 802.11), Bluetooth (e.g., IEEE 802.15.1), or one or more of the Communication Access for Land Mobiles (CALM) wireless communication protocols and air interfaces. The vehicle-to-vehicle (V2V) transmissions between the short-range communication system 616 can be sent via DSRC, Bluetooth, satellite, GSM infrared, IEEE 802.11, WiMAX, RFID, and/or any suitable wireless communication media, standards, and protocols. In certain systems, short-range communication system 616 can include specialized hardware installed in vehicles 610 (e.g., transceivers, antennas, etc.), while in other examples the short-range communication system 616 can be implemented using existing vehicle hardware components (e.g., radio and satellite equipment, navigation computers) or can be implemented by software running on a mobile device of drivers and passengers within the vehicle 610. The range of V2V communications can depend on the wireless communication standards and protocols used, the transmission/reception hardware (e.g., transceivers, power sources, antennas), and other factors. Short-range V2V communications can range from just a few feet to many miles, and different types of driving behaviors, vehicle operational parameters, and the like, can be determined depending on the range of the V2V communications.

V2V communications also can include vehicle-to-infrastructure (V2I) communications, such as transmissions to or from vehicles to or from non-vehicle receiving devices, such as infrastructure. Infrastructure can include one or more of toll booths, rail road crossings, parking garages, road segments, parking lots, buildings or other structures, and/or road-side traffic monitoring devices which can include one or more sensors for detecting environmental conditions (e.g., weather, lighting, etc.) as well as parking availability. Certain V2V communication systems can periodically broadcast data from a vehicle 610 to any other vehicle or other infrastructure device capable of receiving the communication within the range of the vehicle's transmission capabilities. For example, a vehicle 610 can periodically broadcast (e.g., every 0.1 second, every 0.5 seconds, every second, every 5 seconds, dynamically, etc.) certain vehicle operation data via its short-range communication system 616, regardless of whether or not any other vehicles or reception devices are in range. In other examples, a vehicle communication system, such as short-range communication system 616, can first detect nearby vehicles and receiving devices, and can initialize communication with each by performing a handshaking transaction before beginning to transmit its vehicle operation data to the other vehicles and/or devices. Broadcasts from infrastructure can also have varying ranges and, in some examples, infrastructure can broadcast data to an intermediate station which can then relay the information to the data processing server system 650 (or other device).

The types of vehicle operational data, vehicle driving data, breakdown issue data, or the like, transmitted to or from vehicle 610 and/or infrastructure can depend on the protocols and standards used for the V2V or V2I communication, the range of communications, and other factors. In certain examples, vehicle 610 can periodically broadcast corresponding sets of similar vehicle driving data, such as the location (which can include an absolute location in GPS coordinates or other coordinate systems, and/or a relative location with respect to another vehicle or a fixed point), speed, and direction of travel. In certain examples, the nodes in a V2V (or V2I) communication system (e.g., vehicles and other reception devices) can use internal clocks with synchronized time signals and can send transmission times within V2V (or V2I) communications so that the receiver can calculate its distance from the transmitting node based on the difference between the transmission time and the reception time. The state or usage of the vehicle's controls and instruments can also be transmitted, for example, whether the vehicle is accelerating, braking, turning, and by how much, and/or which of the vehicle's instruments are currently activated by the driver (e.g., head lights, turn signals, hazard lights, cruise control, 4-wheel drive, traction control, etc.). Vehicle warnings such as a detection by the vehicle's internal systems that the vehicle is skidding, that an impact has occurred, or that the vehicle's airbags have been deployed, that a vehicle has stopped unexpectedly, also can be transmitted in V2V and/or V2I communications.

In various other examples, any data collected by any vehicle sensors 611 potentially can be transmitted via V2V or V2I communication to other nearby vehicles or infrastructure devices receiving V2V and/or V2I communications from short-range communication system 616. Further, additional vehicle driving data not from the vehicle's sensors (e.g., vehicle make/model/year information, driver insurance information, driving route information, vehicle maintenance information, driver scores, etc.) can be collected from other data sources, such as adjuster device 630, and transmitted using V2V or V2I communications to nearby vehicles and other receiving devices using short-range communication system 616.

The data annotation system 600 in FIG. 6 also includes an adjuster device 630. Adjuster device 630 can be, for example, a smartphone or other mobile phone, personal digital assistant (PDA), tablet computer, and the like, and can include some or all of the elements described herein. Specifically, it should be noted that some or all of the functionality described with respect to vehicle 610 and/or data processing server system 650 can be implemented using adjuster device 630. Some devices in the data annotation system 600 (e.g., adjuster device 630) can be configured to establish communication sessions with vehicle-based devices and various internal components of vehicle 610 via wireless networks or wired connections (e.g., for docked devices), whereby such mobile devices (e.g., adjuster device 630) can have secure access to internal vehicle sensors 611 and other vehicle-based systems. However, in other examples, the adjuster device 630 might not connect to vehicle-based computing devices and internal components, but can operate independently by communicating with vehicle 610 via their standard communication interfaces (e.g., telematics device 613, etc.), or might not connect at all to vehicle 610.

Adjuster device 630 can include a network interface 632, which can include various network interface hardware (e.g., adapters, modems, wireless transceivers, etc.) and software components to enable adjuster device 630 to communicate with data processing server system 650, vehicle 610, and/or various other external computing devices. One or more specialized software applications, such as a data annotation application 634, can be stored in the memory of the adjuster device 630. The data annotation application 634 can be received (e.g., downloaded or otherwise provided) via network interface 632 from the data processing server system 650, vehicle 610, or other application providers (e.g., application stores). As discussed herein, the data annotation application 634 can include various user interface screens, and can be configured to run as user-initiated applications or as background applications. The memory of the adjuster device 630 also can include databases 635 configured to receive and store a variety of data as described herein.

Adjuster device 630 can include various components configured to generate and/or receive vehicle data, driver data, and driving data or other operational data, as well as communicate with other devices within the data annotation system 600. As discussed herein, the data annotation application 634 can store and analyze the data from various mobile device components, historical data, and the like, and can use this data, in conjunction with one or more other devices (e.g., data processing server system 650), to determine annotations for data associated with the vehicle (or any other item). Adjuster device 630 can store, analyze, and/or transmit the data to one or more other devices, such as data processing server system 650. As discussed herein, the data processing server system 650 can obtain data describing damage to an item, determine one or more adjuster devices to annotate the data, obtain annotation data from the adjuster devices, and score the performance of the adjuster devices. In some examples, one or more of these functions can be performed by the processing components of the data adjuster device (e.g., via data annotation application 634). Therefore, in certain arrangements, the adjuster device 630 can be used in conjunction with, or in place of, the data processing server system 650.

The data annotation system 600 also can include one or more data processing server systems 650, containing some or all of the hardware/software components described herein. The data processing server system 650 can include hardware, software, and network components to receive data (e.g., signals or other electronic transmissions) related to location, operational data, and the like, process the data, control an amount or type of data collected by sensors and/or transmitted for processing or analysis, determine adjuster devices to annotate the data, obtain annotation data, and score the performance of the adjuster devices, from one or more of vehicle 610, adjuster device 630, and/or other data sources. The data processing server system 650 can include a database 652 and data processing server system application 651 to respectively store and analyze data received from vehicle 610, adjuster device 630, and/or other data sources.

In some examples, some data can be received by the data processing server system 650 from vehicle 610 wirelessly via telematics device 613. Additionally, the data processing server system 650 can receive additional data from other third-party data sources, such as external traffic databases containing traffic data (e.g., amounts of traffic, average driving speed, traffic speed distribution, and numbers and types of accidents, etc.) at various times and locations, external weather databases containing weather data (e.g., rain, snow, sleet, and hail amounts, temperatures, wind, road conditions, visibility, etc.) at various times and locations, and other external data sources containing driving hazard data (e.g., road hazards, traffic accidents, downed trees, power outages, road construction zones, school zones, and natural disasters, etc.), route and navigation information, and insurance company databases containing insurance data (e.g., coverage amount, deductible amount, premium amount, insured status) for the vehicle, driver, and/or other nearby vehicles and drivers, and the like.

Data stored in the database 652 can be organized in any of several different manners. For example, a roadside assistance table can contain data related to previous roadside assistance issues, vehicle features (e.g., organized by make, model, year, etc.), special equipment needs for particular vehicles, images of roadside assistance issues, etc. Other tables in the database 652 can store additional data, including data types discussed above (e.g. traffic information, road-type and road condition information, weather data, insurance policy data, etc.). Additionally, one or more other databases of other insurance providers containing additional driver data and vehicle data can be accessed to retrieve such additional data. In a variety of embodiments, this data can include a risk map including data associated with one or more of vehicle accident data, traffic data, vehicle volume data, vehicle density data, road characteristic data, or weather data for a variety of geographical locations. Systems and methods for generating and utilizing risk maps that can be utilized in accordance with embodiments of the invention are disclosed in U.S. Pat. No. 9,581,461, titled "Data Processing System Communicating with a Map Data Processing System to Generate a Display of One or More Segments of One or More Vehicle Routes" and issued Feb. 28, 2017, the disclosure of which is hereby incorporated by reference in its entirety.

The data processing server system application 651 within the data processing server system 650 can direct the data processing server system 650 to retrieve data from the database 652, or can receive data directly from adjuster device 630, or other data sources, and can perform one or more analyses to evaluate the data received, determine one or more adjuster devices, provide data to the adjuster devices, obtain annotation data from the adjuster devices, score the performance of the adjuster devices, and other related functions. The functions performed by the data processing server system 650 can be performed by specialized hardware and/or software separate from the additional functionality of the data processing server system 650. Such functions and further descriptions and examples of the algorithms, functions, and analyses that can be executed by the data processing server system 650 are described herein.

In various examples, the roadside assistance analyses, identifications and determinations can be performed entirely in the data processing server system 650 and/or can be performed entirely by the adjuster device 630. In other examples, certain analyses of data, and the like, can be performed by vehicle-based devices and/or adjuster device 630, while other data analyses are performed by the data processing server system 650. Various other combinations of devices processing data can be used without departing from the invention.

It should be noted that any sensors and/or data as described herein can be captured and/or processed with respect to any item, such as a home, boat, airplane, and the like. Additionally, other sensors, such as temperature sensors, occupancy sensors, break detection sensors, smoke detectors, carbon monoxide detectors, and the like, can be used to capture data for processing as described herein.

Various aspects described herein can be embodied as a method, an apparatus, or as one or more computer-readable media storing computer-executable instructions. Accordingly, those aspects can take the form of an entirely hardware embodiment, an entirely software embodiment, or an embodiment combining software and hardware aspects. Any and/or all of the method steps described herein can be embodied in computer-executable instructions stored on a computer-readable medium, such as a non-transitory computer readable medium. Any and/or all of the method steps described herein can be embodied in computer-readable instructions stored in the memory of an apparatus that includes one or more processors, such that the apparatus is caused to perform such method steps when the one or more processors execute the computer-readable instructions. In addition, various signals representing data or events as described herein can be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures can be performed in other than the recited order, and that one or more steps illustrated can be optional in accordance with aspects of the disclosure. Further, one or more aspects described with respect to one figure or arrangement can be used in conjunction with other aspects associated with another figure or portion of the description. Accordingly, the scope of the invention should be determined not by the embodiments illustrated, but by the appended claims and their equivalents.

What is claimed is:

1. A method for providing data processing from a crowd-sourced group, comprising:
   obtaining, by a data processing server system, item data describing a particular item, wherein the item data comprises a set of images of the particular item;
   anonymizing, by the data processing server system, the item data;
   automatically determining, by the data processing server system, a threshold value;
   determining, by the data processing server system, a plurality of adjuster devices having a score greater than the threshold value;
   generating, by the data processing server system, job request data based on the anonymized item data;
   transmitting, by the data processing server system, the job request data to the plurality of adjuster devices;
   obtaining, by the data processing server system, acceptance data generated based on the job request data from at least one of the plurality of adjuster devices;
   determining, by the data processing server system, an adjuster score for each of the at least one of the plurality of adjuster devices, wherein the acceptance data and adjuster score indicate a first adjuster device in the plurality of adjuster devices;
   transmitting, by the data processing server system and to the first adjuster device, the anonymized item data;
   receiving, by the data processing server system from the first adjuster device, annotation data associated with a set of features in the anonymized data to the data processing server system;
   providing, by the data processing server system, the anonymized item data to a trained machine classifier;
   generating, by the trained machine classifier, a performance data for the first adjuster device based on accuracy of the annotation data transmitted by the first adjuster device as determined by the trained machine classifier;
   generating, by the data processing server system, an updated adjuster score associated with the first adjuster device and based on the performance data for the first adjuster device; and
   transmitting, by the data processing server system, to the first adjuster device, the updated adjuster score.

2. The method of claim 1, further comprising:
   obtaining, by the data processing server system and from the first adjuster device, the annotation data; and
   generating, by the data processing server system, scoring data based on the annotation data, wherein the scoring data indicates a performance of the adjuster device.

3. The method of claim 1, further comprising:
   obtaining, by the data processing server system and from a third-party server system, certification data for a set of adjuster devices; and
   determining, by the data processing server system, the at least one adjuster device based on the certification data for the set of adjuster devices.

4. The method of claim 3, wherein the certification data is based on the particular item described in the item data.

5. The method of claim 1, further comprising:
   obtaining, by the data processing server system and from the first adjuster device, first annotation data;
   obtaining, by the data processing server system and from a second adjuster device in the plurality of adjuster devices, second annotation data; and
   generating, by the data processing server system, scoring data based on the first annotation data and the second annotation data, wherein the scoring data indicates a performance of the first adjuster device relative to the second adjuster device.

6. The method of claim 1, further comprising:
   obtaining, by the data processing server system and from the first adjuster device, annotation data;
   generating, by the data processing server system, scoring data based on the annotation data, wherein the scoring data indicates a performance of the first adjuster device;
   generating, by the data processing server system, an aggregate score for the anonymized item data based on annotation data received from a second plurality of adjuster devices distinct from the first adjuster device; and
   generating feedback data based on the aggregate score and the scoring data.

7. The method of claim 1, further comprising providing, by the data processing server system, the feedback data to the first adjuster device.

8. A data processing server system, comprising:
   at least one processor; and
   memory storing instructions that, when read by the at least one processor, cause the data processing server system to:
      obtain item data describing a particular item, wherein the item data comprises a set of images of the particular item and an indication of a class associated with the item data;
      anonymize the item data;
      automatically determine a threshold value;
      determine a plurality of adjuster devices having a score greater than the threshold value and based on the class associated with the anonymized item data;
      generate job request data based on the anonymized item data;
      transmit the job request data to the plurality of adjuster devices;

obtain acceptance data generated based on the job request data from at least one of the plurality of adjuster devices;

determine, by the data processing server system, an adjuster score for each of the at least one of the plurality of adjuster devices, wherein the acceptance data and adjuster score indicate a first adjuster device in the plurality of adjuster devices;

transmit, to the first adjuster device, the anonymized item data;

receive, from the first adjuster device, annotation data associated with a set of features in the anonymized data to the data processing server system;

provide the anonymized item data to a trained machine classifier, the trained machine classifier to generate a performance data for the first adjuster device based on accuracy of the annotation data transmitted by the first adjuster device as determined by the trained machine classifier;

generate an updated adjuster score associated with the first adjuster device and based on the performance data for the first adjuster device; and transmitting, by the data processing server system, to the first adjuster device, the updated adjuster score.

9. The data processing server system of claim 8, wherein the instructions, when read by the at least one processor, further cause the data processing server system to:
obtain, from the first adjuster device, the annotation data; and
generate scoring data based on the annotation data, wherein the scoring data indicates a performance of the first adjuster device.

10. The data processing server system of claim 8, wherein the instructions, when read by the at least one processor, further cause the data processing server system to:
obtain, from the first adjuster device, the annotation data;
obtain, from a second adjuster device in the plurality of adjuster devices, second annotation data; and
generate scoring data based on the annotation data and the second annotation data, wherein the scoring data indicates a performance of the first adjuster device.

11. The data processing server system of claim 8, wherein the instructions, when read by the at least one processor, further cause the data processing server system to:
obtain, from a third-party server system, certification data for a set of adjuster devices; and
determine the at least one adjuster device further based on the certification data for the set of adjuster devices.

12. The data processing server system of claim 11, wherein the certification data is based on the class associated with the item data.

13. The data processing server system of claim 8, wherein the instructions, when read by the at least one processor, further cause the data processing server system to:
obtain, from the first adjuster device, the annotation data;
generate scoring data based on the annotation data, wherein the scoring data indicates a performance of the first adjuster device;
generate an aggregate score for the anonymized item data based on annotation data received from a second plurality of adjuster devices distinct from the first adjuster device; and
generate feedback data based on the aggregate score and the scoring data.

14. The data processing server system of claim 8, wherein the instructions, when read by the at least one processor, further cause the data processing server system to provide the feedback data to the first adjuster device.

15. A method for scoring adjuster devices, comprising:
obtaining, by a data processing server system, item data describing a particular item, wherein the item data comprises a set of images of the particular item;
anonymizing, by the data processing server system, the item data;
automatically determining, by the data processing server system, a threshold value;
determining, by the data processing server system, a plurality of adjuster devices having an initial score greater than the threshold value;
generating, by the data processing server system, job request data based on the anonymized item data;
transmitting, by the data processing server system, the job request data to the plurality of adjuster devices;
obtaining, by the data processing server system, acceptance data generated based on the job request data from at least one of the plurality of adjuster devices;
determining, by the data processing server system, an adjuster score for each of the at least one of the plurality of adjuster devices, wherein the acceptance data and adjuster score indicate a first adjuster device in the plurality of adjuster devices;
transmitting, by the data processing server system and to the first adjuster device, the anonymized item data;
obtaining, by the data processing server system and from the first adjuster device, annotation data associated with a set of features in the anonymized data to the data processing server system;
providing, by the data processing server system, the anonymized item data to a trained machine classifier;
generating, by the trained machine classifier, a performance data for the first adjuster device based on accuracy of the annotation data transmitted by the first adjuster device as determined by the trained machine classifier;
generating, by the data processing server system, an updated adjuster score associated with the first adjuster device and based on the performance data for the first adjuster device;
generating, by the data processing server system, an aggregate score for the anonymized item data based on annotation data received from a plurality of adjuster devices distinct from the first adjuster device;
generating feedback data based on the aggregate score and the updated adjuster score; and
providing, by the data processing server system, the feedback data to the first adjuster device.

16. The method of claim 15, wherein an adjuster device generates annotation data by:
obtaining the anonymized item data;
determining a set of features in the anonymized item data;
associating at least one annotation with each feature in the set of features;
generating annotation data comprising the at least one annotation for each feature in the set of features; and
transmitting the annotation data to the data processing server system.

* * * * *